Dec. 30, 1952 W. E. EVANS, JR 2,624,041

AMPLITUDE MODULATOR OF THE OUTPHASING TYPE

Filed Nov. 28, 1949

INVENTOR.
WILLIAM E. EVANS JR.
BY Wade Koontz AND
ATTORNEY
James S. Shannon
AGENT Patented Dec. 30, 1952 2,624,041

UNITED STATES PATENT OFFICE 2,624,041

AMPLITUDE MODULATOR OF THE OUTPHASING TYPE

William E. Evans, Jr., Menlo, Park, Calif., assignor to the United States of America as represented by the Secretary of the Air Force Application November 28, 1949, Serial No. 129,799

10 Claims. (Cl. 332—23)

This invention relates to phase modulation with particular reference to phase modulation as employed in amplitude modulation systems of the outphasing type.

In an outstanding system of amplitude modulation two voltages are required having the same amplitude and frequency, and phase shifted equal amounts in opposite directions by the modulating signal. When two such voltages are vectorally added the result is an amplitude modulated voltage of constant phase and of the same frequency as the component voltages.

It is the object of the invention to provide means for generating two phase modulated voltages of the above described type.

More specifically, it is the object of the invention to provide means for producing, from a common source of alternating voltage of frequency $f_1$, two voltages of frequency $f_1$ which are simultaneously phase modulated by a single modulating signal so that a phase shift of one of the voltages by an amount $\pm p$ is always accompanied by a phase shift of the other voltage by an amount $\mp p$.

The generation of two such voltages is accomplished in accordance with the invention by intermodulating the outputs of first and second oscillators generating voltages of different frequencies to produce voltages having the sum and difference frequencies of the oscillator frequencies. In addition the output of the second oscillator is phase modulated by the modulating signal. The phase modulated voltage is then intermodulated with the sum frequency voltage and the difference frequency selected from the resulting modulation products. The phase modulated voltage is also intermodulated with the first-named difference frequency voltage and the sum frequency selected from the resulting modulation products. In this process the frequency of the phase modulated voltage, which is that of the second oscillator, cancels out so that the above-mentioned selected difference and sum frequency voltages are of the same frequency as that of the first oscillator. Also, in this process, the phase shift of the phase modulated voltage is transferred to the selected difference frequency voltage with reversed sign and to the selected sum frequency voltage with unchanged sign. The two selected voltages therefore are of the same frequency and are phase shifted by equal amounts in opposite directions as required.

As stated above, the invention is particularly useful in amplitude modulation systems of the outphasing type, however, its utility is not restricted to such systems but extends to any situation in which two phase modulated voltages of the above described type are required.

A more detailed explanation of a specific embodiment of the invention will be given in connection with the accompanying drawing in which.

Figure 1:
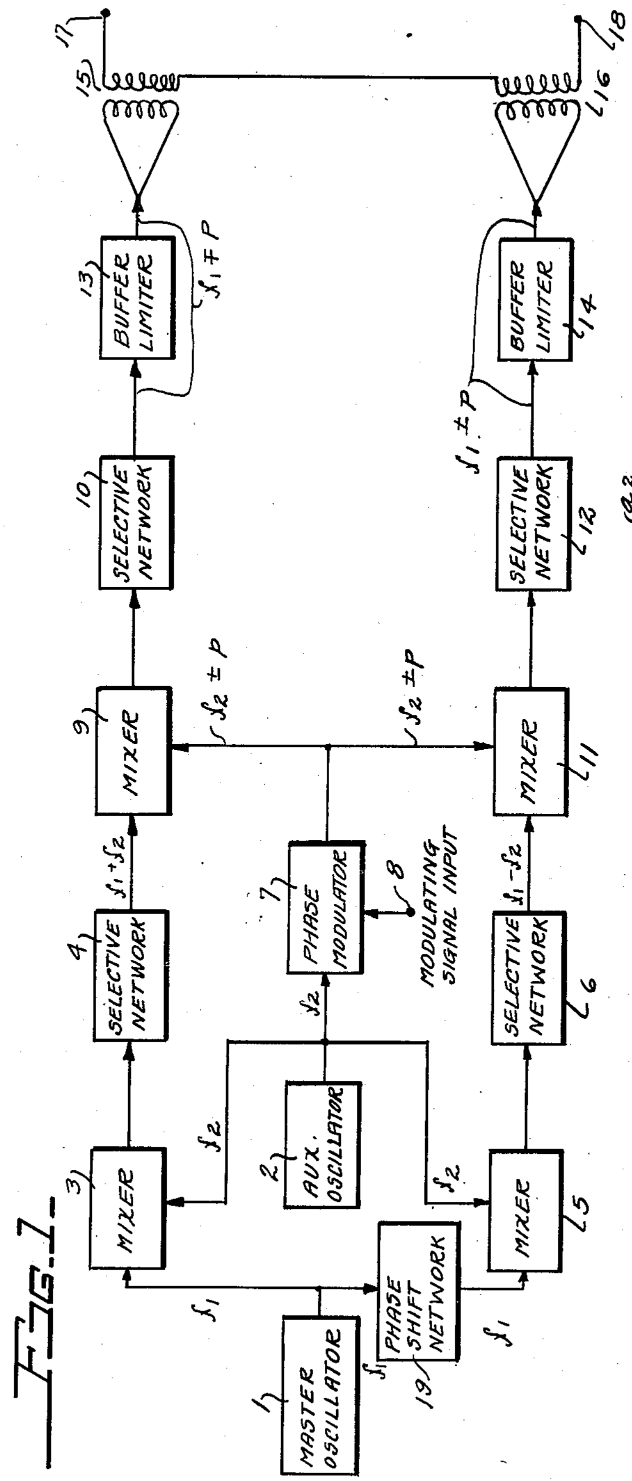
Fig. 1 is a block diagram of a modulating circuit incorporating the invention.

Referring to Fig. 1, the master oscillator 1 generates an alternating voltage of frequency $f_1$ and the auxiliary oscillator 2 generates an alternating voltage of frequency $f_2$. These oscillators may be of any suitable type and may include any apparatus in addition to the oscillator itself, such as frequency multipliers, that may be required to produce the desired frequencies. The frequencies $f_1$ and $f_2$ are applied to mixers 3 and 5 which may be any suitable nonlinear devices capable of converting two applied frequencies through intermodulation thereof into a number of new frequencies or modulation products among which are an upper side-band frequency equal to the sum of the applied frequencies and a lower side-band frequency equal to the difference of the applied frequencies. The mixers 3 and 5 may therefore be passive nonlinear impedances or networks, or they may be any of the available vacuum tubes capable of the above described frequency conversion and commonly referred to as mixers or converters. The selective network 4 is coupled to the output of mixer 3 and is designed to pass the upper side-band frequency $f_1+f_2$ and to reject all of the other modulation products of this mixer. Similarly, the filter 6 is coupled to the output of mixer 5 but is designed to pass only the lower side-band frequency $f_1-f_2$. Since both frequencies $f_1+f_2$ and $f_1-f_2$ are present in the output of each of the mixers 3 and 5, it is apparent that, if desired, only one mixer may be employed with the filter 4 and 6 connected to the output of the single mixer to select the desired sum and difference frequencies. Also, the selective networks 4 and 6 have been shown separately for the sake of clarity, however, they could be and probably would be included as a part of the mixer in a practical embodiment of the circuit.

The output voltage of auxiliary oscillator 2, of frequency $f_2$, is also applied to phase modulator 7. This modulator may be any suitable type of phase modulator capable of shifting the phase of a constant frequency signal by an amount that is a function of the instantaneous amplitude of a modulating signal representing intelligence to be transmitted and applied to terminal 8. The output of modulator 7 therefore is a voltage wave of frequency $f_2$ which has been shifted in phase through an angle $p$, the size of which is a function of the instantaneous amplitude of the modulating signal. Since the phase shift may be of either sign, i. e. leading or lagging, the phase shift angle is indicated in Fig. 1 by $\pm p$.

The phase modulated wave from modulator 7 is applied to mixers 9 and 11 which may be any suitable nonlinear devices capable of generating the sum and difference or upper and lower side-band frequencies of a pair of applied frequencies, as in the case of mixers 3 and 5. Also, the voltage of frequency $f_1+f_2$ from network 4 is applied to mixer 9 and the voltage of frequency $f_1-f_2$ is applied to mixer 11, and these mixers operate to produce the upper and lower side-band or sum and difference frequencies of the two applied frequencies in their output circuits. The selective network 10 is designed to pass only the lower side-band or difference frequency from mixer 9 which, it will be apparent, is $f_1$, and the selective network 12 is designed to pass only the upper side-band or sum frequency from mixer 11 which is also $f_1$. Hence the output voltages of networks 10 and 12 are of the same frequency $f_1$, which is also the frequency of master oscillator 1. A further result of the action of mixers 9 and 11 is to transfer, degree for degree, the phase shift $\pm p$ of the $f_2$ phase modulated output of modulator 7 to the voltage of frequency $f_1$ appearing in the output circuits of the mixers and selected by networks 10 and 12. Further, in the case of the lower side-band or difference frequency, which is selected by network 10, the sign of the transferred phase shift is reversed so that the phase shift of the voltage passed by network 10 is $\mp p$.

The transference of the phase shift $\pm p$ from frequency $f_2$ to frequency $f_1$ may be further explained by the following consideration: The action of a nonlinear device such as mixers 9 and 11 with respect to the generation of upper and lower side band or sum and difference frequencies of two applied frequencies may be represented mathematically as the product of the two applied frequencies. Letting $e_a$, $e_b$ and $e_c$ represent the voltage outputs of network 4, network 6 and modulator 7, respectively, the values of these voltages are $$e_a=E_a \sin (2\pi f_1 t+2\pi f_2 t)$$
$$e_b=E_b \sin (2\pi f_1 t-2\pi f_2 t)$$
$$e_c=E_c \sin (2\pi f_2 t\pm p)$$

where $E_a$=maximum amplitude of $e_a$
$E_b$=maximum amplitude of $e_b$
$E_c$=maximum amplitude of $e_c$
$t$=time
$p$=phase shift produced by modulator 7 at any given time For mixer 9:

$$e_a e_c=E_a \sin (2\pi f_1 t+2\pi f_2 t)E_c \sin (2\pi f_2 t\pm p)$$
$$=\frac{E_aE_c}{2}\cos (2\pi f_1 t\mp p)-\frac{E_aE_c}{2}\cos (2\pi f_1 t+4\pi f_2 t\pm p)$$

and for mixer 11:

$$e_b e_c=E_b \sin (2\pi f_1 t-2\pi f_2 t)E_c \sin (2\pi f_2 t\pm p)$$
$$=\frac{E_bE_c}{2}\cos (2\pi f_1 t-4\pi f_2 t\mp p)-\frac{E_bE_c}{2}\cos (2\pi f_1 t\pm p)$$

In the equation for mixer 9 the term $$\frac{E_aE_c}{2}\cos (2\pi f_1 t\mp p)$$

represents the lower side-band or difference frequency which is selected by network 10. In the equation for mixer 11 the term $$\frac{E_aE_c}{2}\cos (2\pi f_1 t\pm p)$$

represents the upper side-band or sum frequency which is selected by network 12. As indicated by the above two terms therefore the output voltages of networks 10 and 12 are of the same frequency $f_1$ and are phase shifted in opposite directions through an angle $p$.

Figure 2:
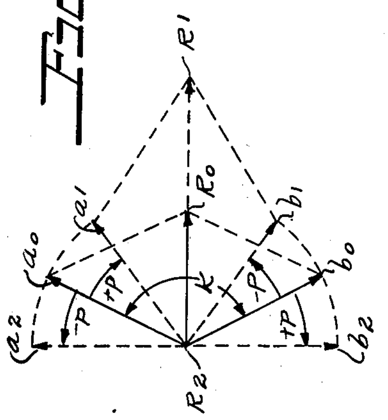
Fig. 2 is a vector diagram illustrating the operation of the invention.

The phase shift angle $p$ is with reference to the phases which the two output voltages have in the absence of a modulating signal or, in other words, when $p=0$. This condition is represented in the vector diagram of Fig. 2 in which vectors $a_0$ and $b_0$ represent the output voltages of networks 10 and 12, respectively, when $p=0$. The angle $k$ represents a constant phase difference between the two voltages. This angle may be set to any desired value by introducing the proper amount of constant phase shift at an appropriate point or points in the system. In Fig. 1 a phase shifting network 19 is shown between oscillator 1 and mixer 5 for the purpose of fixing the value of $k$.

When the above described phase modulating system is to be used in an amplitude modulating system of the outphasing type it is desirable that the two phase modulated voltages be of the same amplitude, and the limiters 13 and 14 are employed for producing this equality. These limiters may be parts of vacuum tube buffer stages for isolating the phase modulating system from subsequent power amplifier apparatus. The output voltages of buffer-limiter stages 13 and 14 are consequently limited to the same fixed amplitude but correspond to the input voltages in frequency and phase. The two limited output voltages are vectorally combined by transformers 15 and 16, the secondaries of which are connected in series, to produce an amplitude modulated signal of frequency $f_1$ between terminals 17 and 18. This process is illustrated by the vector diagram of Fig. 2, vectors $a_0-a_1-a_2$ and $b_0-b_1-b_2$ representing in this case the output voltages of limiters 13 and 14, respectively. The vectors $a_0$ and $b_0$ represent the output voltages in the absence of modulation and combine to form the carrier $R_0$ of the resulting amplitude modulated wave. The effect of modulation is to shift the phase of the output vectors through the angle $\pm p$ from their unmodulated phases as represented by vectors $a_0$ and $b_0$. The maximum phase shifts in each direction are represented by vectors $a_1-b_1$ and $a_2-b_2$, which vectors combine to give the maximum and minimum amplitudes of the resulting amplitude modulated wave represented by $R_1$ and $R_2$, the latter being zero. In outphasing systems of amplitude modulation the angle $k$, which represents the phase separation of the two channels in the absence of modulation, usually has a value of the order of 130°.

Figure 3:
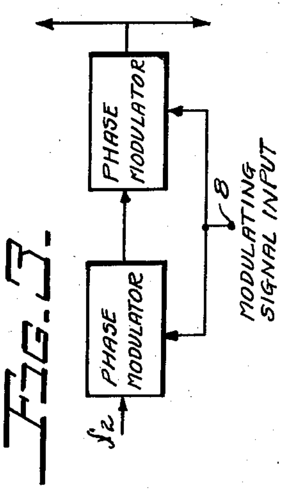
Fig. 3 shows a modification of the phase modulator 7 of Fig. 1.

For application to an outphasing system of amplitude modulation the system described has the advantage of introducing the required phase modulation into the high frequency stage of a radio transmitter which employs frequency multiplication up from a stabilized oscillator of lower frequency. This feature reduces the amount of frequency and phase multiplication that must take place after modulation over that which would result if the modulation were done at the low oscillator frequency. This is desirable from the standpoint of more easily maintaining a low noise and hum level when the amount of phase modulation needed at the final frequency is no greater than can be conveniently obtained with conventional phase modulators. In an outphasing system the maximum amount of phase deviation needed in each channel will normally be less than one radian, a value relatively easily achieved in conventional single tube phase modulator circuits. In the event that more phase modulation is desired than can be conveniently obtained with one tube the phase modulator 7 may be made to include two or more phase modulator stages in cascade as shown in Fig. 3.

Various circuit arrangements employing the principles of the invention will be apparent to those skilled in the art and it is not intended that the scope of the invention be limited to the single specific embodiment shown in Fig. 1.

I claim:

1. Phase modulating apparatus comprising a master oscillator and an auxiliary oscillator for generating electrical waves of constant but different frequencies, means for intermodulating the waves generated by said oscillators, means for selecting from the resulting modulation products the wave having a frequency equal to the sum of said oscillator frequencies and the wave having a frequency equal to the difference of said oscillator frequencies, phase modulating means, means for coupling the output circuit of said auxiliary oscillator to said phase modulating means, means for applying a modulating signal to said modulating means for producing in the output circuit thereof an electric wave phase modulated in accordance with the amplitude of said modulating signal, means for intermodulating said sum frequency wave and said phase modulated wave and for selecting the lower side-band wave from the resulting modulation products, said lower side-band wave having a frequency equal to the difference between the frequencies of said sum frequency wave and said phase modulated wave and having a phase displacement equal to and of opposite sign with respect to that of said phase modulated wave, and means for intermodulating said first mentioned difference frequency wave and said phase modulated wave and for selecting the upper side-band wave from the resulting modulation products, said upper side-band wave having a frequency equal to the sum of the frequencies of said difference frequency wave and said phase modulated wave and having a phase displacement equal to and of the same sign as that of said phase modulated wave, whereby said selected upper and lower side-band waves are of the same frequency as the wave generated by said master oscillator and have phase displacements from their phases in the absence of a modulating signal that are equal and of opposite signs.

2. A circuit for generating two voltages of the same frequency that are phase modulated by equal amounts and in opposite directions in accordance with the instantaneous amplitude of a modulating signal, said circuit comprising a master oscillator and an auxiliary oscillator for generating voltages of constant but different frequencies, a plurality of mixer circuits each of which is capable of converting two applied frequencies into upper and lower side-band frequencies equal to the sum and difference respectively of the applied frequencies, means for applying the voltages generated by said master and auxiliary oscillators to a first of said mixer circuits and also to a second of said mixer circuits, a phase modulating means, means for applying said modulating signal and the voltage generated by said auxiliary oscillator to said phase modulating means for phase modulating the latter voltage in accordance with the instantaneous amplitude of said modulating signal, means for applying said phase modulated voltage and the voltage of upper side-band frequency from the output of said first mixer circuit to a third of said mixer circuits, means for applying said phase modulated voltage and the voltage of lower side-band frequency from the output of said second mixer circuit to a fourth of said mixer circuits, and means for selecting the voltage of lower side-band frequency from the output of said third mixer circuit and the voltage of upper side-band frequency from the output of said fourth mixer circuit, said latter two selected voltages being of the same frequency as that of said master oscillator and being phase modulated by equal amounts in opposite directions.

3. A circuit for generating two voltages of the same frequency that are phase modulated by equal amounts and in opposite directions in accordance with the instantaneous value of a characteristic of a modulating signal, said circuit comprising means for generating a first voltage of constant frequency and a second voltage of constant frequency different from the frequency of said first voltage, a plurality of mixer means each capable of converting two applied frequencies into upper and lower side-band frequencies equal to the sum and difference respectively of said applied frequencies, means for applying said first and second voltages to a first of said mixer means and for selecting from the output thereof a voltage of the upper side-band frequency and a voltage of the lower side-band frequency, phase modulating means, means for applying said second voltage and said modulating signal to said phase modulating means for phase modulating said second voltage in accordance with the instantaneous value of a characteristic of said modulating signal, means for applying said voltage of upper side-band frequency and said phase modulated voltage to a second of said mixer means, means for applying said voltage of lower side-band frequency and said phase modulated voltage to a third of said mixer means, and means for selecting the voltage of lower side-band frequency from the output of said second mixer means and the voltage of upper side-band frequency from the output of said third mixer means, said latter two selected voltages being of the same frequency as said first voltage and in the presence of a modulating signal being displaced in phase by equal amounts and in opposite directions from their phases in the absence of a modulating signal.

4. An amplitude modulating circuit comprising apparatus as claimed in claim 1 and in addition means for vectorally adding said selected upper and lower side-band waves.

5. An amplitude modulating circuit comprising a circuit as claimed in claim 2 together with means for vectorally adding said latter two selected voltages.

6. An amplitude modulating circuit comprising a circuit as claimed in claim 3 together with means for vectorally adding said latter two selected voltages.

7. Apparatus as claimed in claim 2 in which means are provided for limiting each of said latter two selected voltages to a constant amplitude.

8. Apparatus as claimed in claim 7 in which means are provided for vectorally adding said limited voltages whereby an amplitude modulated voltage of the frequency of said limited voltages and of constant phase is produced.

9. Apparatus as claimed in claim 8 in which said adding means comprises two transformers having their secondary windings connected in series and in which means are provided for applying one of said limited voltages to the primary winding of one of said transformers and the other of said limited voltages to the primary winding of the other of said transformers.

10. Apparatus as claimed in claim 3 in which said phase modulating means comprises a plurality of phase modulators in cascade.

WILLIAM E. EVANS, Jr.

REFERENCES CITED

The following references are of record in the file of this patent:

UNITED STATES PATENTS

| Number | Name | Date |
|---|---|---|
| 2,220,201 | Bliss | Nov. 5, 1940 |